Patented May 15, 1951

2,553,033

UNITED STATES PATENT OFFICE 2,553,033

TETRAKISAZO DYESTUFFS

Werner Bossard, Riehen, near Basel, and Marcel Reding, Basel, Switzerland, assignors to J. R. Geigy A. G., Basel, Switzerland, a Swiss firm No Drawing. Application December 20, 1948, Serial No. 66,396. In Switzerland December 23, 1947

7 Claims. (Cl. 260—166)

This invention relates to the manufacture of green tetrakisazo dyestuffs. These dyestuffs which are believed to be new, are eminently suitable for dyeing natural or regenerated cellulose, yielding green dyeings with a purity of shade previously unobtainable with this class of dyestuffs. The dyeings can be after-treated with formaldehyde or with diazotised p-nitraniline by the usual methods, whereby their fastness to water and washing, particularly to repeated soap-washing, is considerably improved without causing any marked change in the purity of shade. Thanks to these outstanding properties the new dyestuffs represent a valuable addition to the important class of after-treated dyestuffs which are fast to wet conditions.

According to the present invention a tetrakisazo dyestuff is obtained by (1) coupling a tetrazotised m- or p-mono(aminobenzoyl)-p-phenylenediamine compound with one molecular proportion of an o-hydroxy-carboxylic acid of the benzene series and one molecular proportion of a 1-amino-2-alkoxy-naphthalene compound coupling in the p-position to the amino group, (2) diazotising the resulting aminodisazo dyestuff and coupling it with a 1-(m-aminobenzoyl-amino)-8-hydroxynaphthalene sulfonic acid coupling in the o-position to the hydroxyl group and (3) diazotising the resulting aminotrisazo dyestuff and coupling it with a 1,3-dihydroxy- or 1,3-hydroxyamino compound of the benzene series capable of coupling twice, the respective components of these coupling reactions being so chosen that the tetrakisazo dyestuff contains at least 3 and not more than 4 sulfonic acid groups.

The new tetrakisazo dyestuffs correspond to the formula

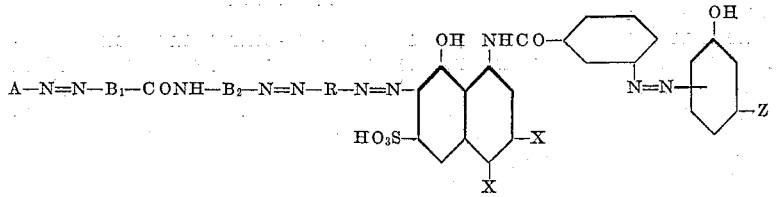

wherein
A represents the radical of an o-hydroxy carboxylic acid of the benzene series,
B$_1$ represents an unsulfonated aryl radical of the benzene series connected to A—N=N in m- or p-position to the CO-group,
B$_2$ represents an aryl radical of the benzene series carrying the azo group in p-position to the NH-group, R represents a 2-alkoxy naphthalene radical carrying the azo groups in positions 1 and 4 of the naphthalene nucleus and linked to B$_2$ by the azo group in position 4,
One X represents H and the other X represents SO$_3$H, and Z represents OH or NH$_2$.

Accordingly, the following are suitable for use in the manufacture of the tetrakisazo dyestuffs of the invention:

For step 1:
(a) o-Hydroxycarboxylic acids of the benzene series such as, for example, salicylic acid, o-cresotic acid, m-cresotic acid and 3-chloro-2-hydroxy-benzoic acid.
(b) m- and p-Monoaminobenzoyl compounds of p-phenylene diamine compounds, which may also contain substituents common in azo dyestuffs, e. g., 4-(4'-aminobenzoylamino)-1-aminobenzene, 4-(3'-aminobenzoylamino)-1-aminobenzene, 5-(3'- or 4'-aminobenzoylamino)-2-aminobenzene-1-carboxylic acids, 5-(3'- or 4'-amino-benzoylamino)-2-amino-benzene-1-sulfonic acids, 5-(3'-amino-4'-methylbenzoylamino)- or 5-(3'-amino-4'-chlorobenzoylamino)-2-aminobenzene-1-carboxylic acids or -1-sulfonic acids, whereby the 5-(3'- and 4'-aminobenzoylamino)-2-aminobenzene-1-sulfonic acids are foremost in suitability because of their ready availability, their favourable behaviour in the manufacture of the tetrakisazo dyestuffs and their good effect on purity of shade.
(c) 2-alkoxy-1-aminonaphthalene compounds coupling in the p-position to the amino group, e. g., 2-methoxy- or 2-ethoxy-1-amino-naphthalene and especially 2-methoxy- or 2-ethoxy-1-aminonaphthalene-6-sulfonic acids, 2-(carboxymethoxy)-1-aminonaphthalene-6-sulfonic acid.

For step 2:
(d) 1 - (3' - aminobenzoylamino) - 8 - hydroxy-naphthalene-sulfonic acids coupling in the o-position to the hydroxyl group, e. g., 1-(3'-aminobenzoylamino) - 8 - hydroxynaphthalene-4-sulphonic acid, 1-(3'-aminobenzoyl-amino) - 8 - hydroxynaphthalene - 3,6 - disulfonic acid or -4,6-disulfonic acid. Because of the greater purity of the final tetrakisazo dyestuff obtained with them and the particularly brilliant shades of colour in the ultimate dyestuff the 1-(3'-aminobenzoylamino)-8-hydroxynaphthalene-3,6- or 4,6-disulfonic acids are preferred among the group of third coupling components enumerated above.

For step 3:

(e) As the final components which can be coupled twice, i. e., 1,3-dihydroxy and 1,3-hydroxyamino compounds of the benzene series may be mentioned, e. g., 1,3-dihydroxybenzene (which yields the best dyestuffs) and 1-amino-3-hydroxybenzene. In the case of the latter compound, the position in which it couples under the conditions of the coupling reaction herein described cannot be deduced from the results given in the literature.

The method of preparation of the green tetrakisazo dyestuffs of the invention, which have the general formula

wherein A, B, C, D and E correspond to the compounds listed under (a) to (e) which are built into the dyestuff molecule, is shown in the following examples. These illustrate the invention without limiting it to them however. Parts are by weight and temperatures in degrees centigrade.

*Example 1*

30.7 parts of 4-(4'-aminobenzoyl-amino)-1-aminobenzene-2-sulfonic acid are tetrazotised in the usual manner and linked with 13.8 parts of 1-hydroxybenzene-2-carboxylic acid to yield an intermediate. When the latter is formed, the reaction mixture is made weakly acid with a solution of 20 parts of 40% acetic acid and 25 parts of concentrated hydrochloric acid. It is then mixed with a neutral solution of 25.3 parts of 1-amino-2-methoxynaphthalene-6-sulfonic acid in 300 parts of water. To speed up coupling 4 parts of sodium carbonate are added so as to leave a weak acid reaction. The disazo dyestuff formed is dissolved with 5 parts of caustic soda, mixed with 425 parts of common salt and 200 parts of concentrated hydrochloric acid, then diazotised with 8.2 parts of sodium nitrite at 25°. After completion of diazotisation the mixture is filtered and the residue washed. The diazo compound is then coupled with 43.8 parts of 1-(3'-aminobenzoylamino) - 8 - hydroxynaphthalene-3,6-disulfonic acid in 250 parts of water in the presence of 200 parts of pyridine and 25 parts of crystalline sodium acetate. The trisazo dyestuff, when formed, is precipitated with common salt, filtered and washed. It is diazotised in suspension with 8.2 parts of sodium nitrite and 70 parts of conc. hydrochloric acid at 10–12° and coupled with 11 parts of 1,3-dihydroxybenzene in the presence of 40 parts of sodium carbonate. The completed tetrakisazo dyestuff is salted out at 60°, filtered and dried.

It is a dark green powder, giving a yellowish green solution in water and a brown one in conc. sulpuric acid. It dyes cotton and staple fibre particularly pure shades of green. By after-treating the dyeing with formaldehyde or by development with diazotised p-nitraniline, the fastness to water and to washing is improved.

The same outstanding fastness properties when wet are obtained if 43.8 parts of 1-(3'-aminobenzoylamino) - 8 - hydroxynaphthalene - 3,6-disulfonic acid are replaced by 43.8 parts of 1-(3'-aminobenzoylamino) - 8 - hydroxynaphthalene-4,6-disulfonic acid or by 35.8 parts of 1-(3'-aminobenzoylamino) - 8 - hydroxynaphthalene-4-sulfonic acid or if instead of 11 parts of 1,3-dihydroxybenzene there are used 10.9 parts of 1-amino-3-hydroxybenzene for the final coupling, the method otherwise remaining as described in the example.

*Example 2*

30.7 parts of 4-(3'-aminobenzoylamino)-1-aminobenzene-2-sulfonic acid are tetrazotised as usual and coupled with 13.8 parts of 1-hydroxybenzene-2-carboxylic acid and 25.3 parts of 1-amino-2-methoxynaphthalene-6-sulfonic acid to yield the disazo dyestuff. The latter is dissolved with 5 parts of caustic soda, mixed with common salt and 200 parts of hydrochloric acid and diazotised at 25° with 8.2 parts of sodium nitrite. The diazo compound is coupled with 43.8 parts of 1 - (3' - aminobenzoylamino) - 8 - hydroxynaphthalene-3,6-disulfonic acid in the presence of 200 parts of pyridine and 25 parts of sodium carbonate. The trisazo dyestuff is salted out, filtered and further diazotised with 8.2 parts of sodium nitrite and 70 parts of hydrochloric acid. The diazonium compound formed is coupled with 11 parts of 1,3-dihydroxy benzene in alkaline soda solution to yield the tetrakisazo dyestuff.

The dyestuff is isolated in the usual way and and is a dark green powder, giving a bluish-green solution in water and a brown one in sulphuric acid. It dyes vegetable fibres in pure bluish green shades. Dyeings after-treated with formaldehyde or diazotised p-nitraniline are particularly fast to washing and water.

If in this example 26.2 parts of 5-(3'-aminobenzoylamino)-2-aminobenzene-1-carboxylic acid, 27.6 parts of 5-(3'-amino-4'-methylbenzoylamino)-2-aminobenzene-1-carboxylic acid, 29.65 parts of 5-(3'-amino-4'-chlorobenzoylamino)-2-aminobenzene-1-carboxylic acid, 32.1 parts of 5-(3' - amino - 4' - methylbenzoylamino) - 2 - aminobenzene-1-sulfonic acid or 34.15 parts of 5 - (3' - amino - 4' - chlorobenzoylamino) - 2-aminobenzene-1-sulfonic acid, are tetrazotised instead of 30.7 parts of 4-(3'-aminobenzoylamino)-1-aminobenzene-2-sulfonic acid then dyestuffs are obtained which are similar in shade and have the same outstanding wet-fastness properties.

*Example 3*

22.7 parts of 4-(4'-aminobenzoylamino)-1-aminobenzene are tetrazotised and combined in the normal way with 13.8 parts of 1-hydroxybenzene-2-carboxylic acid and 25.3 parts of 1-amino-2-methoxynaphthalene-6-sulfonic acid to give the disazo dyestuff. This is diazotised further by the method described in Example 1 and coupled with 43.8 parts of 1-(3'-aminobenzoylamino)-8-hydroxynaphthalene-3,6-disulfonic acid in the presence of 200 parts of pyridine and 25 parts of crystalline sodium acetate. The trisazo dyestuff formed is salted out, filtered and diazotised in suspension with 8.2 parts of sodium nitrite and 70 parts of concentrated hydrochloric acid. The diazonium compound formed is coupled with 11 parts of 1,3-dihydroxybenzene in the presence of 40 parts of sodium carbonate, the tetrakisazo dyestuff isolated with common salt, filtered and dried.

It is a dark green powder, giving a green solution in water and a brown one in concentrated sulphuric acid. It dyes cellulose fibres in green shades. After-treatment of the dyeings with formaldehyde or diazotised p-nitraniline produces outstanding fastness properties under wet conditions.

Similar dyestuffs are obtained if instead of 22.7 parts of 4-(4'-amino-benzoylamino)-1-aminobenzene there are used 24.1 parts of 4-(4'-aminobenzoylamino) - 3 - methyl - 1 - aminobenzene or 26.25 parts of 4-(4'-aminobenzoylamino)-3-chloro-1-aminobenzene, or if instead of 11 parts of 1,3-dihydroxybenzene there are used 10.9 parts of 1-amino-3-hydroxybenzene, the method otherwise remaining as described in the above example.

*Example 4*

The tetrazo compound from 30.7 parts of 4-(4' - aminobenzoylamino) - 1 - aminobenzene - 2-sulfonic acid is combined as in Example 1 with 13.8 parts of 1-hydroxybenzene-2-carboxylic acid to give an intermediate product. The reaction mixture is made weakly acid and coupled with a solution, slightly acid to Congo red, of 18.7 parts of 1-amino-2-ethoxynaphthalene to yield the disazo dyestuff. This is dissolved with 5 parts of caustic soda, mixed with common salt and 200 parts of hydrochloric acid and diazotised with 8.2 parts of sodium nitrite at 25°.

The diazonium compound formed is filtered, washed and coupled with 43.8 parts of 1-(3'-aminobenzoylamino) - 8 - hydroxynaphthalene-4,6-disulfonic acid in the presence of 200 parts of pyridine and 35 parts of sodium carbonate to give the trisazo dyestuff. The latter is salted out, filtered and diazotised in suspension with 8.2 parts of sodium nitrite and 70 parts of hydrochloric acid. The diazonium compound produced is coupled with 11 parts of 1,3-dihydroxybenzene in alkaline soda solution, the dyestuff being worked up as usual.

The dark powder obtained gives a green solution in water and a brown one in concentrated sulphuric acid. It dyes vegetable fibres in green shades which have excellent wet-fastness properties on being after-treated with formaldehyde or diazotised p-nitraniline.

Similar dyestuffs are obtained when 15.2 parts of 4-resp. 3-methyl-2-hydroxybenzene-1-carboxylic acid or 17.2 parts of 3-chloro-2-hydroxybenzene-1-carboxylic acid are used instead of 1-hydroxybenzene-2-carboxylic acid, the process being otherwise as described in the example. Furthermore, if the 18.7 parts of 1-amino-2-ethoxynaphthalene are replaced by 17.3 parts of 1-amino-2-methoxynaphthalene than a very similar dyestuff with similar properties is obtained.

*Example 5*

26.2 parts of 4-(4'-aminobenzoylamino)-1-aminobenzene-2-carboxylic acid are tetrazotised and mixed with 15.2 parts of 4-methyl-2-hydroxybenzene-1-carboxylic acid and 30 parts of sodium carbonate to give an intermediate product. The reaction mixture is made weakly acid and coupled with 26.7 parts of 1-amino-2-ethoxynaphthalene-6-sulfonic acid to produce the disazo dyestuff. This is further diazotised by the method described in Example 1 and coupled with 43.8 parts of 1-(3'-aminobenzoylamino) - 8 - hydroxynaphthalene - 3,6 - disulfonic acid in the presence of 200 parts of pyridine and 25 parts of sodium acetate to produce the trisazo dyestuff. After the latter has been isolated, it is diazotised in suspension with 8.2 parts of sodium nitrite and 70 parts of hydrochloric acid. This is followed by coupling with 11 parts of 1,3-dihydroxybenzene in the presence of 40 parts of sodium carbonate to give the tetrakisazo dyestuff which is salted out, filtered and dried.

Cellulose fibres are dyed a pure green with the dyestuff obtained. The dyeings are made faster to washing by after-treatment with formaldehyde.

Similar dyestuffs with the same fastness properties are obtained if 1-(3'-aminobenzoylamino) - 8 - hydroxynaphthalene - 3,6 - disulfonic acid in this example is replaced by 43.8 parts of 1-(3'-aminobenzoylamino)-8-hydroxynaphthalene-4,6-disulfonic acid, or 35.8 parts of 1 - (3' - aminobenzoylamino) - 8 - hydroxy - naphthalene-4-sulfonic acid.

*Example 6*

30.7 parts of 4-(4'-aminobenzoylamino)-1-aminobenzene-2-sulfonic acid are tetrazotised as usual and coupled first with 13.8 parts of 1-hydroxybenzene-2-carboxylic acid in alkaline, soda solution, and then with the sodium salt from 29.7 parts of 2-(carboxymethoxy)-1-aminonaphthalene-6-sulfonic acid in 300 parts of water, the solution being made acid with acetic acid. The disazo dyestuff formed is further diazotised as described in Example 1 and the diazo compound combined with 43.8 parts of 1 - (3' - aminobenzoylamino) - 8 - hydroxy - naphthalene-3,6-disulfonic acid in 250 parts of water in the presence of 200 parts of pyridine and 25 parts of crystalline sodium acetate. The trisazo dyestuff which forms is separated with common salt, filtered and washed with dilute brine. It is suspended in 200 parts of water and 70 parts of conc. hydrochloric acid and diazotised at 10–12° with an aqueous solution of 8.2 parts of sodium nitrite. This is followed by coupling with a solution of 11 parts of 1,3-dihydroxybenzene and 40 parts of sodium carbonate in 300 parts of water at 10° to give the tetrakisazo dyestuff. The latter is salted out at 60°, filtered and dried.

It is a dark green powder, dissolving in water to give a green solution and in conc. sulphuric acid to give a brown one. The dyestuff dyes cotton and staple fibre in pure green shades. After-treatment of the dyeings with formaldehyde or diazotised p-nitraniline increases their fastness to water and to washing.

Pure green dyestuffs with similar properties are obtained on using instead of 30.7 parts of 4 - (4' - aminobenzoylamino) - 1 - aminobenzene-2-sulfonic acid, 30.7 parts of 4-(3'-aminobenzoylamino)-1-aminobenzene-2-sulfonic acid, 22.7 parts of 4-(3'- or 4'-aminobenzoylamino)-1-aminobenzene, 26.2 parts of 5-(3'-aminobenzoylamino) - 2 - aminobenzene - 1 - carboxylic acid, 27.6 parts of 5-(3'-amino-4'-methylbenzoylamino) - 2 - aminobenzene - 1 - carboxylic acid, 29.65 parts of 5-(3'-amino-4'-chlorobenzoylamino) - 2 - aminobenzene - 1 - carboxylic acid, 32.1 parts of 5-(3'-amino-4'-methylbenzoylamino) - 2 - aminobenzene - 1 - sulfonic acid, or 34.15 parts of 5-(3'-amino-4'-chlorobenzoylamino) - 2 - aminobenzene - 1 - sulfonic acid, which are tetrazotised by known methods and the preparation otherwise carried out exactly as described in the above example.

What we claim is:
1. A green tetrakisazo dyestuff corresponding to the formula

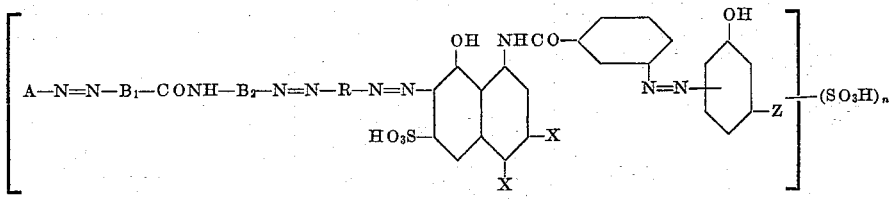

wherein
$n$ stands for an integer not greater than 2
A represents the unsulfonated radical of an o-hydroxy-carboxylic acid of the benzene series,
$B_1$ represents an unsulfonated aryl radical of the benzene series connected to A—N=N— in one of the positions meta and para to the CO-group,
$B_2$ represents an aryl radical of the benzene series carrying the azo group in p-position to the NH-group,
R represents a 2-alkoxy naphthalene radical carrying the azo groups in positions 1 and 4 of the naphthalene nucleus and linked to $B_2$ by the azo group in position 4,
One X represents H and the other X represents $SO_3H$ and Z represents a member selected from the group consisting of OH and $NH_2$.

2. A green tetrakisazo dyestuff corresponding to the formula

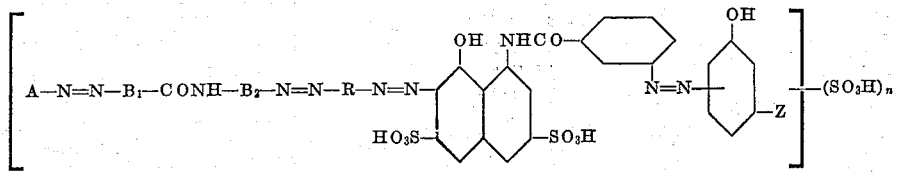

wherein
$n$ stands for an integer not greater than 2
A represents the unsulfonated radical of an o-hydroxy-carboxylic acid of the benzene series,
$B_1$ represents an unsulfonated aryl radical of the benzene series connected to A—N=N— in one of the positions meta and para to the CO-group,
$B_2$ represents an aryl radical of the benzene series carrying the azo group in p-position to the NH-group,
R represents a 2-alkoxy naphthalene radical carrying the azo groups in positions 1 and 4 of the naphthalene nucleus and linked to $B_2$ by the azo group in position 4, and
Z represents a member selected from the group consisting of OH and $NH_2$—.

3. A green tetrakisazo dyestuff corresponding to the formula

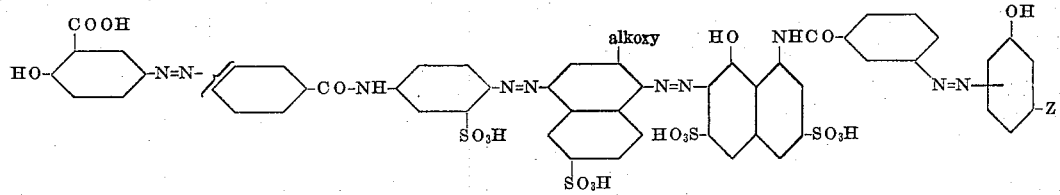

wherein Z represents a member selected from the group consisting of OH and $NH_2$.

4. A green tetrakisazo dyestuff corresponding to the formula

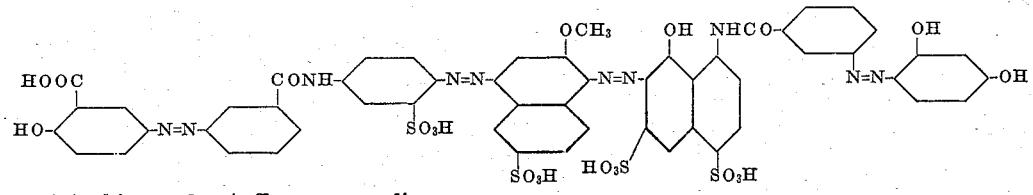

5. A green tetrakisazo dyestuff corresponding to the formula

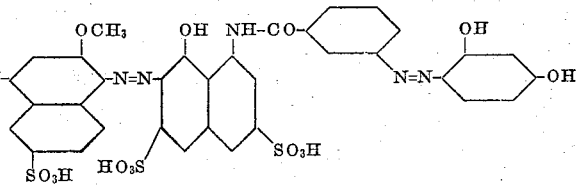

6. A green tetrakisazo dyestuff corresponding to the formula

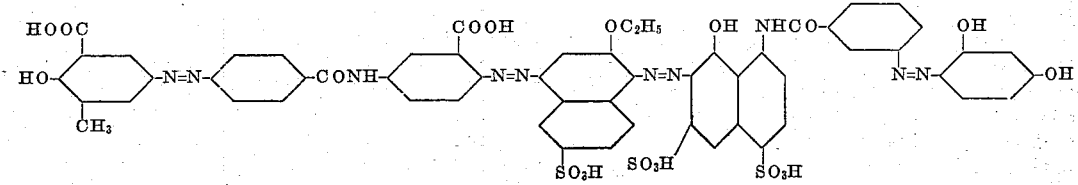

7. A green tetrakisazo dyestuff corresponding to the formula
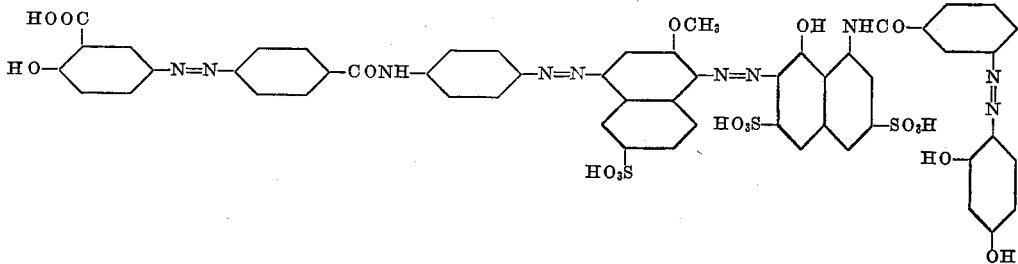
WERNER BOSSARD.
MARCEL REDING.
REFERENCES CITED
The following references are of record in the file of this patent:
UNITED STATES PATENTS
| Number | Name | Date |
|---|---|---|
| 1,901,393 | Glietenberg | Mar. 14, 1933 |
| 2,195,089 | Kollmann | Mar. 26, 1940 |
FOREIGN PATENTS
| Number | Country | Date |
|---|---|---|
| 226,835 | Switzerland | Apr. 30, 1943 |